United States Patent [19]

Mononen

[11] 4,130,209

[45] * Dec. 19, 1978

[54] VEHICLES FOR TAKING ON, TRANSPORTING, AND DISCHARGING A LOAD

[76] Inventor: Sakari M. Mononen, Salkolantie 3 A 15, 01900 Nurmijarvi, Finland

[ * ] Notice: The portion of the term of this patent subsequent to Oct. 12, 1993, has been disclaimed.

[21] Appl. No.: 731,050

[22] Filed: Oct. 8, 1976

Related U.S. Application Data

[63] Continuation-in-part of Ser. No. 588,349, Jun. 19, 1975, Pat. No. 3,985,250.

[30] Foreign Application Priority Data

Jun. 20, 1974 [FI] Finland .................................. 1909/74
May 14, 1975 [FI] Finland .................................. 751427

[51] Int. Cl.$^2$ ............................................... E02F 3/28
[52] U.S. Cl. ................................................ 214/140
[58] Field of Search .................... 214/78, 90 R, 91 R, 214/92, 145, 140, 774, 775, 776, 131 R, 778, 770, 138 R; 37/118, 4

[56] References Cited

U.S. PATENT DOCUMENTS

| 2,468,220 | 4/1949 | McLendon | 214/131 R |
| 2,978,124 | 4/1961 | Bernotas | 214/140 |
| 3,059,792 | 10/1962 | Bernotas | 214/140 |
| 3,369,680 | 2/1968 | Peterson | 214/145 |
| 3,452,888 | 7/1969 | Larson et al. | 214/80 |
| 3,499,566 | 3/1970 | Wagner | 214/778 X |
| 3,703,973 | 11/1972 | Nilsson | 214/778 |
| 3,985,247 | 10/1976 | Stedman | 214/140 |

FOREIGN PATENT DOCUMENTS

| 1296577 | 5/1969 | Fed. Rep. of Germany | 214/80 |
| 1049753 | 8/1953 | France | 214/778 |

Primary Examiner—Albert J. Makay
Assistant Examiner—Lawrence E. Williams
Attorney, Agent, or Firm—Steinberg & Blake

[57] ABSTRACT

A self-loading vehicle has a frame as well as a ground-engaging structure supporting the frame for travelling movement, this latter structure and frame cooperating to provide for the vehicle a given wheelbase. A lever is pivotally connected with the frame to turn with respect thereto about a lever axis, while a load-carrier is pivotally connected to the lever to turn with respect thereto about a carrier axis. A displacing structure is operatively connected to the frame, the lever, and the load-carrier to displace the lever with respect to the frame while turning the lever about the lever axis and to displace the load carrier with respect to the lever while turning the load carrier about the carrier axis. This displacing structure, the lever, and the load-carrier cooperate with each other to situate the load-carrier in a load-receiving position where the load-carrier is relatively close to the ground and situated beyond the wheelbase, as well as for placing the load carrier in a load-transporting position where the load carrier is closer to the wheelbase than when the load carrier in its load-receiving position, with the load carrier when in its load-transporting position being situated sufficiently close to the wheelbase to provide for stable travel of the vehicle with a load carried by the load-carrier.

16 Claims, 11 Drawing Figures

VEHICLES FOR TAKING ON, TRANSPORTING, AND DISCHARGING A LOAD

CROSS REFERENCE TO RELATED APPLICATION

This application is a continuation-in-part of copending application Ser. No. 588,349, filed June 19, 1975 now U.S. Pat. No. 3,985,250.

BACKGROUND OF THE INVENTION

The present invention relates to vehicles, particularly of the type which are self-loading and which are capable of transporting and discharging the load which the vehicle takes on.

Such a vehicle will have an elongated frame at one end of which is the propelling structure for providing the required traction and steering of the vehicle while at the other end there is the structure for receiving, carrying, and discharging the load.

Conventionally, in order to transport loads of any desired characteristics from one location to another it is required to have a wheeled loading vehicle forming a wheel loader and a separate transporting vehicle which receives the load from the wheel loader. One of the drawbacks encountered when using such a wheel loader is that the friction between the wheels of the loader and the surface engaged thereby exerts a significant influence on the pushing force of the loader and thereby on the extent to which its scoop can be filled. Thus, under certain operating conditions the wheels of the loader engage a slippery soft surface which detracts undesirably from the friction required for efficient operation of the loader. In addition, the wheels tend to sink into such a soft surface with an accompanying increase in the resistance to rolling of the wheels. A further drawback of such wheel loaders arises from difficulties encountered when working on sloping terrain and when encountering unfavorable weight distribution.

Also, when utilizing separate loaders and transporting conveyance, there is an unavoidable and costly standing time when a vehicle which is to transport a load must wait until it receives the load. Such expensive waiting time is particularly noticeable in the event that, for example, the loader breaks down while a vehicle waits its turn to be loaded. Under such conditions the operating or working cycles of several vehicles are undesirably interrupted.

Furthermore, wheel loaders of the above type can only operate when there is sufficient space for the loader to move around both with respect to the load as well as with respect to the vehicle which is to receive the load. As a result when operating in relatively confined spaces, such as in the interior of a tunnel, significant disadvantages are encountered with such conventional procedures and structures.

One of the most serious drawbacks encountered in connection with conventional wheel loaders, whether of the front-end loading type or rear-end loading type, resides in the considerable lack of stability of such conventional wheel loaders during travel thereof. This results from the fact that the bucket which receives the load in such conventional wheel loaders is situated beyond the wheelbase. As a result, the loaded bucket tends to tilt the vehicle, about one of its axles, and when it is remembered that such wheel loaders conventionally operate on rough terrain which may be sharply inclined, it is apparent that there is considerable instability in the travel of such conventional wheel loaders. Therefore, conventional wheel loaders can only operate within an exceedingly limited range, in the immediate vicinity of the load which is to be picked up, requiring the vehicle which is to be loaded to be situated quite close to this load. Up to the present time it has not been possible to provide wheel loaders capable of carrying a load in a safe manner through a substantial distance to a vehicle which is to receive the load, so that of necessity the latter vehicles must be situated quite close to the load, even though wheel loaders are utilized.

In addition, considerable energy is expended in an undesirable manner in operating conventional wheel loaders. Thus, while the buckets of certain types of wheel loaders may be of substantial magnitude, so as to be capable of carrying a considerable load during a single operation, nevertheless the load-carrying capacity of all known conventional wheel loaders is only a fraction of the weight of the wheel loader itself.

SUMMARY OF THE INVENTION

It is accordingly a primary object of the present invention to provide a vehicle structure which will avoid the above drawbacks.

In particular, it is an object of the present invention to provide a self-loading vehicle structure which can travel in a stable manner.

In addition it is an object of the present invention to provide a self-loading vehicle which can transport and then discharge the load which it takes on and which is more economical and more versatile than previously known vehicles.

A further object of the present invention is to provide a structure which may be used not only in connection with loading of a vehicle but also if necessary to more the vehicle with respect to terrain in which the vehicle is stuck under the conditions which otherwise would require the vehicle to be pulled or pushed from its position by another vehicle.

A further object of the present invention is to provide a vehicle of the above type which can readily be adapted for use with different types of load carriers.

Also it is an object of the present invention to provide a vehicle of the above type with the capability of carrying out operations through much larger ranges than has heretofore been possible.

Also it is an object of the present invention to provide a vehicle which need only move the load through an extremely short distance from the original location of the load to the location of the load during transport thereof.

Also it is an object of the present invention to provide a vehicle where the load-receiving component can move directly along the ground so as to provide superior loading operations as compared with a situation where the load carrier must always be elevated above the ground, so that the load must be raised into the load carrier.

In addition it is an object of the present invention to provide a structure which is capable of handling a load in the form of large one-piece objects such as large stones which may have a weight up to the entire transporting capacity of the vehicle.

Also it is an object of the present invention to provide a vehicle which can operate in a space the length of which is no greater than the width required for the travel of the vehicle itself, so that the vehicle of the invention can operate under extremely confined conditions as, for example, in tunnels.

Furthermore, it is an object of the present invention to provide a vehicle which can operate under conditions where the friction between the vehicle and the surface on which it is supported or the inclination of the terrain cannot decisively influence the efficiency of the loading operations.

In addition it is an object of the present invention to provide a vehicle according to which an exceedingly favorable weight distribution can be achieved in such a way that an extremely large useful load can be carried with the useful load having a magnitude which may be substantially greater than the weight of the vehicle itself. This feature is in sharp contrast with a wheel loader, for example, which at most can only handle a weight equal to approximately ⅓ of the weight of the wheel loader itself.

According to the invention, the self-loading vehicle which is capable of taking on a load, transporting the load, and then discharging the load, includes a frame means and a ground-engaging means supporting the frame means for travelling movement. The ground-engaging means and the frame means cooperate with each other to provide the vehicle with a wheelbase of predetermined length. A lever means is pivotally connected with the frame means for turning movement with respect thereto about a lever axis. A load-carrier means is pivotally connected to the lever means for turning movement with respect thereto about a carrier axis. A displacing means is operatively connected to the frame means, the lever means, and the load-carrier means for displacing the lever means with respect to the frame means while turning the lever means about the lever axis and for displacing the load-carrier means with respect to the lever means while turning the load-carrier means about the carrier axis. The displacing means, lever means, and load-carrier means cooperate with each other for situating the load-carrier means in a load-receiving position where the load-carrier means is relatively close to the ground and situated beyond the wheelbase, as well as for placing the load-carrier means in a load-transporting position where the load-carrier means is closer to the wheelbase than when the load-carrier means is in its load-receiving position, with the load-carrier means when in its load-transporting position being situated sufficiently close to the wheelbase to provide for stable travel of the vehicle with a load carried by the load-carrier means. The displacing means, lever means, and load-carrier means also cooperate with each other to place the load-carrier means in a load-discharging position where the load-carrier means has been turned about the carrier axis with respect to the lever means while the load-carrier means is situated at an elevation higher than when the load-carrier means is in its load-receiving position.

BRIEF DESCRIPTION OF DRAWINGS

The invention is illustrated by way of example in the accompanying drawings which form part of this application and in which.

DESCRIPTION OF THE PREFERRED EMBODIMENTS

In the embodiments of the invention which are illustrated in FIGS. 1–7, the vehicle has a load-carrier means in the form of a container 1 which, when the vehicle is in a load-transporting mode, may have an upper open end while when the vehicle is in a mode for taking on a load, the open end of the container is directed toward the load while the load operation is in progress.

Figure 3A:
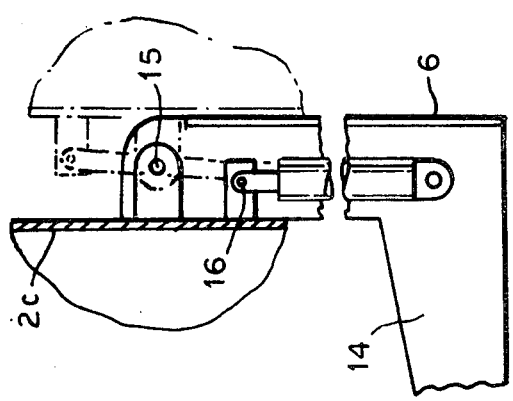
FIG. 3A is a fragmentary schematic illustration of the manner in which the load-carrying container of FIGS. 1-3 is turned from the load-carrying position of FIG. 2 into the load-discharging position of FIG. 3.
Figure 1:
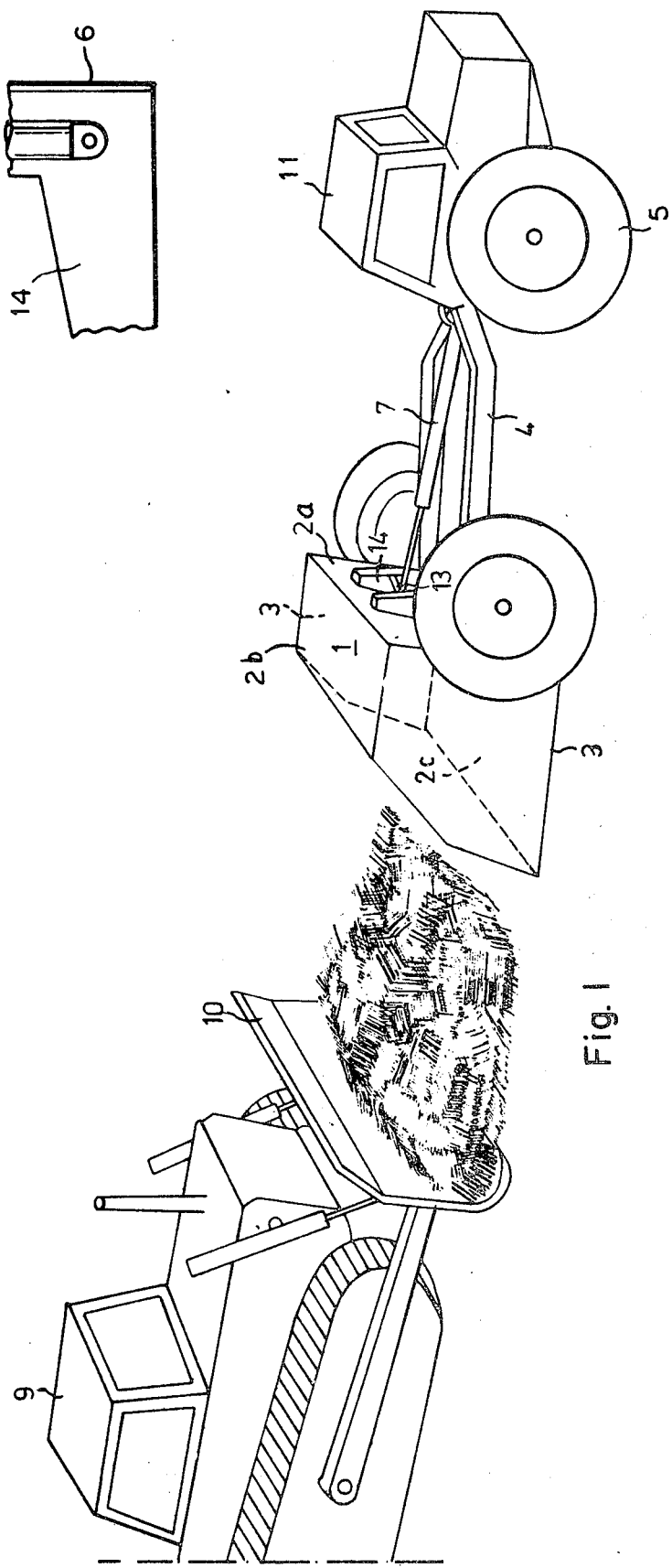
FIG. 1 is a simplified schematic perspective illustration of a vehicle according to the invention shown in a load-receiving mode with a tractor being shown in FIG. 1 to facilitate the loading operations.
Figure 2:
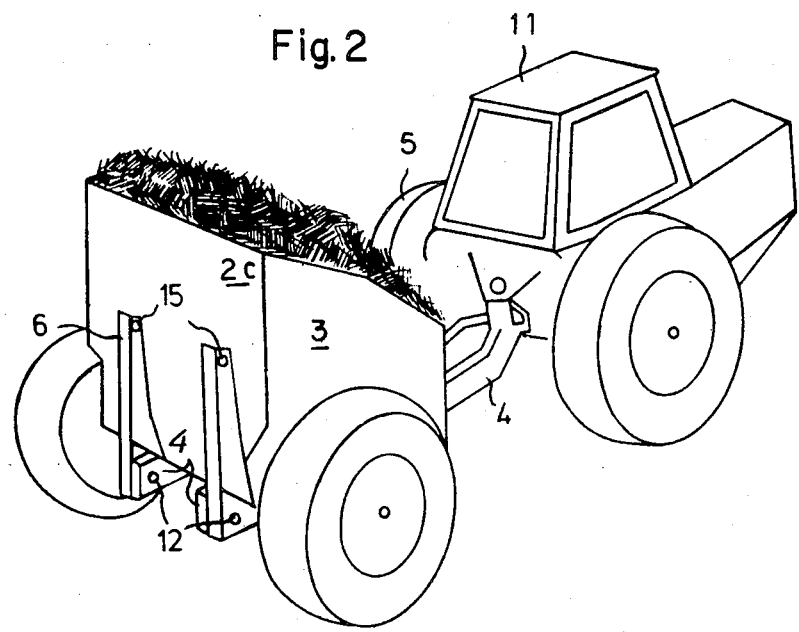
FIG. 2 is a schematic perspective illustration of the vehicle of the invention of FIG. 1 as shown when viewed from the rear and in the condition where the vehicle is in a load-transporting mode.
Figure 3:
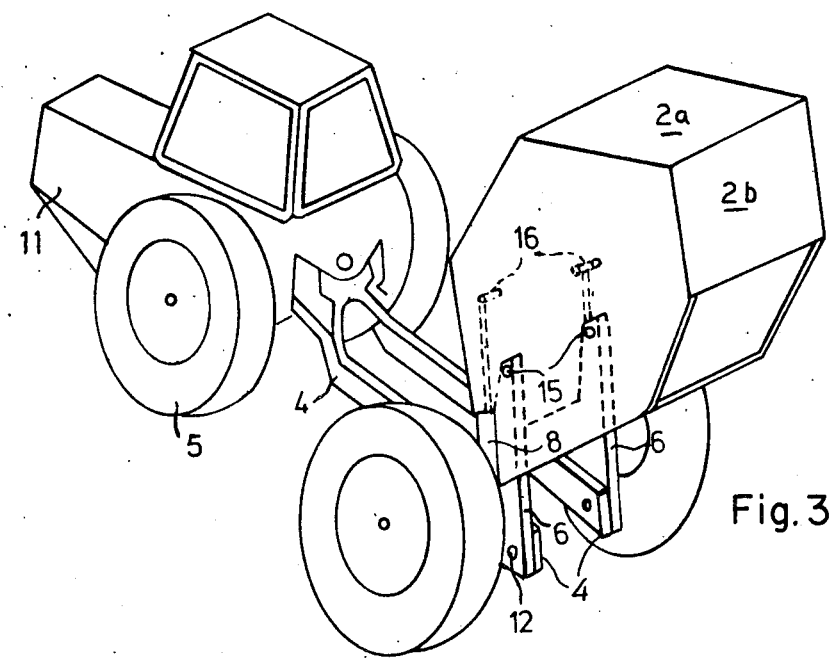
FIG. 3 is also a perspective schematic illustration of the vehicle of FIGS. 1 and 2 from the rear with FIG. 3 showing the vehicle in a load-discharging mode.

The container 1 of FIGS. 1–3 has opposed end walls 3 which extend generally in the direction of vehicle travel. Thses opposed end walls are interconnected by a transversely extending bottom wall 2a as well as a pair of opposed transverse walls 2b and 2c. It will be noted that the wall 2b is shorter than the wall 2c, with the latter forming the rear wall of the container and extending in an upright attitude when the vehicle is in the load-transporting mode of FIG. 2. With respect to FIGS. 4–7, however, the container 1, while having the opposed end walls 3 which extend generally in the direction of travel and which are parallel to each other has only a single curved wall 2 which forms the container with the walls 3, the wall 2 having and inner concave surface defining with the walls 3 the interior of the container 1 of FIGS. 4–7.

Thus, the load carrier means of FIGS. 4–7 may have a generally scoop-shaped configuration.

The vehicle has a robust elongated horizontally extending frame means 4 which in the illustrated example has a propelling means 11 operatively connected to its front end region, the propelling means including at least a pair of front wheels 5 in the illustrated example. Thus, the propelling means 11 can include any suitable engine as well as a cab for the vehicle operator and of course the wheels 5 to support the vehicle during travel thereof. At an opposed rear end region of the frame means 4 of the vehicle there are at least one additional pair of wheels is illustrated in order to support the vehicle during travel thereof. The vehicle may appropriately be one that is body-pivot steered, and to a large extent it may be of a standard design.

Thus, it will be seen that the pairs of wheels referred to above provide for the vehicle a ground-engaging means which supports the frame means 4 for travelling movement. This ground-engaging means together with the frame means provide for the vehicle a wheelbase of a given length, this length being equal to the distance between the front and rear axles or the distance between a line extending across the points of contact of the front wheels with the ground and a line extending across the points of contact of the rear wheels with the ground. Moreover, the vehicle structure need not be oriented as illustrated in FIG. 1. Thus for example the propelling means 11 can be reversed so as that the operator while seated in the cab faces toward the left as viewed in FIG. 1, so that with such an arrangement the right wheels of a FIG. 1 may be considered the rear wheels while the left wheels may be considered the front wheels.

In the example of FIG. 1 there is pivotally connected to the rear end region of the frame means 4 a lever means 6, 14. In the particular example illustrated the lever means includes a pair of separate bell cranks which are fixed to each other so as to operate in synchronism, these bell cranks being connected by way of pivots 12 to the rear end region of the frame means 4 so as to turn about the common lever axis formed by the pivots 12. As is apparent from FIG. 2, in the load-transporting mode the arms 6 extend upwardly from the lever axis, these arms 6 serving by way of pivots 15 to carry the load-carrier means 1. In the load-transporting mode shown in FIG. 2, the arms 14 of the lever means extend substantially horizontally from the lever axis toward the front end region of the frame means 4. As is apparent from FIG. 1, the pair of arms 14 are fixed to each other by way of a transverse bar 13 which in turn is pivotally connected to a piston rod of a hydraulic unit 7 whose cylinder is pivotally connected to the front end region of the frame means 4. This unit 7 forms a displacing means which may be extended to the position shown in FIG. 1 in order to turn the lever means 6, 14 about the lever axis into a position for placing the vehicle in a mode for taking on a load. In this position shown in FIG. 1, the arm 14 extends upwardly from the lever axis while the arm 6, not visible in FIG. 1, extends rearwardly away from the front end of the frame means 4.

With the load-carrier means 1 in the load-receiving position shown in FIG. 1, the loading operations can be carried out for example by way of a scoop 10 operated by a tractor 9 which is capable of pushing the material into the container 1 in the position of the parts shown in FIG. 1. Of course, instead of using the tractor structure 9, 10 it is possible also simply to place the vehicle in reverse and to push the load-carrier means 1 directly into the load, which may be a pile of gravel, for example, so that in this way a self-loading operation can be carried out.

Assuming that the load has thus become situated in the interior of the container 1, then in order to place the vehicle in the mode for transporting the load, as shown in FIG. 2, it is only necessary to operate the displacing means 7 so as to swing the lever means from the position of FIG. 1 into the position of FIG. 2. Now the vehicle is in its load-transporting mode where the arms 14 extend horizontally and the arms 6 extend upwardly. It is to be noted that the levels 6, 14 can be situated at least to small extent inwardly of the planes occupied by the end walls 3 so that the wall 2c can directly engage the arms 6 while the bottom wall 2a can directly engage the arms 14 when the vehicle is in the load-transporting mode of FIG. 2 with load-carrier means 1 in its load-transporting position. In addition it is to be noted that in the load-transporting position of FIG. 2 the center of gravity of the load is within the wheelbase of the vehicle so that an extremely stable support for the load is achieved.

This latter feature forms an important part of the present invention inasmuch as it is possible as a result of this feature for the load-carrier means 1, when in its load-transporting position shown in FIG. 2, to carry an exceedingly large load in an entirely stable manner enabling the vehicle of the invention to transport a load in a fully stable manner even on rough terrain which may be sharply inclined. Thus, with the vehicle of the invention another vehicle which is to receive the load can conveniently be located at a considerably distance from the load inasmuch as the vehicle of the invention can safely travel through such a considerable distance over rough, sharply inclined terrain between the load and the location where the load is to be discharged. It will be noted that with an arrangement as shown in FIG. 2, the load-carrier means provides for the load a center of gravity which is situated over the wheelbase. It has been found that the travel of the vehicle will be sufficiently stable as long as the load-carrier means, when in its load-transporting position shown in FIG. 2, provides for the load a center of gravity which is situated from the wheelbase by a distance which is no greater than 15% although in many cases this distance may be no greater than 10%, or 5% from the wheelbase. The illustrated arrangement where the center of gravity of the load is situated over the wheelbase is of course preferred inasmuch as this provides the greatest stability. Thus, it is possible in accordance with the invention to arrange the load-transporting means so that it situates the center of gravity of the load beyond the wheelbase, but in this event the center of gravity of the load should not be located beyond the wheelbase by a distance greater than 20% of the wheelbase.

A further important feature of the invention resides in the fact that the load-carrier means has a capacity which may be on the order of 150% of the weight of the vehicle itself, so that an exceedingly efficient operation can be provided, although the vehicle of the invention can still achieve outstanding advantages even if the load-carrying capacity of the load-carrier means is on the order of 75% of the weight of the vehicle.

As is apparent from the above, the pivots 12 provide for the lever means a horizontal pivot axis, extending perpendicularly across the direction of vehicle travel, and situated at a relatively low elevation as determined by the frame means 4.

As was indicated above, the wall 2c of the load-carrier means 1 of FIGS. 1-3 is pivotally connected to the upper end regions of the arms 6 as viewed in FIG. 2, by way of pivots 15. These pivots 15 provide for the load-carrier means 1 a carrier axis which is parallel to the lever axis determined by the pivots 12. As is apparent from FIG. 2, when the vehicle is in its load-transporting mode, the carrier axis determined by the coaxial pivots 15 is at an elevation substantially higher than the lever axis. The container 1 is connected to the bell cranks only at the pivots 15 so that the container 1 is turnable with respect to the bell cranks about the carrier axis determined by the pivots 15.

As is shown schematically in FIG. 3 and as is indicated fragmentarily and schematically in FIG. 3A, the arms 6 respectively carry hydraulic units 8 the cylinders of which are pivotally connected to the arms 6 and the pistons of which are pivotally connected with suitable brackets which are fixed to and project from the wall 2c. This wall 2c carries additional brackets which are pivotally connected with the pivots 15 carried by the arms 6. This arrangement is such that when a hydraulic fluid under pressure is fed to the cylinders of the units 8, these units will become extended and will turn the container 1 through substantially 180° so that the wall 2c instead of being situated at the front of the arms 6 in the transport mode of FIG. 2 become situated at the rear of the arms 6 in the load-discharging mode of FIG. 3. This operation is clearly apparent from FIG. 3A. Of course the units 8 are displaced laterally with respect to the pivots 15 and the brackets connected thereto by a distance sufficient to permit the full extension to take place in the manner shown in FIG. 3A. If desired a single rod can extend between the arms 6 and carry substantially midway between the latter a single unit 8 pivotally connected to a bracket fixed to the wall 2c so that in this way a single operating unit 8 may be used to turn the load-carrier means 1 about the carrier axis from the transport position of FIG. 2 into the discharge position shown in FIG. 3.

Thus, with the above construction there is the advantage that the container 1 is unloaded from an elevation which is at a considerable height above the ground.

Figure 4:
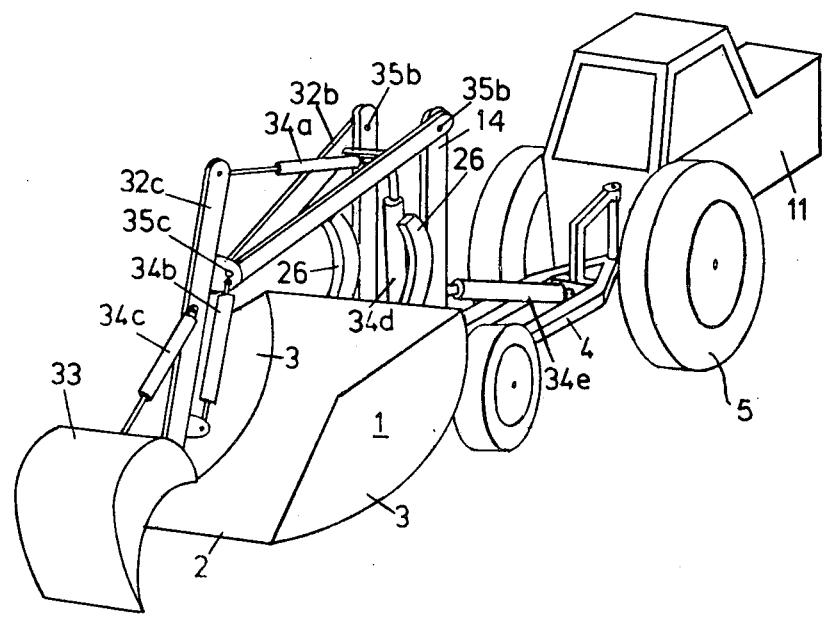
FIG. 4 is a perspective schematic illustration of another embodiment of a vehicle according to the invention as seen from the rear with the vehicle being shown in its mode for taking on a load.
Figure 5:
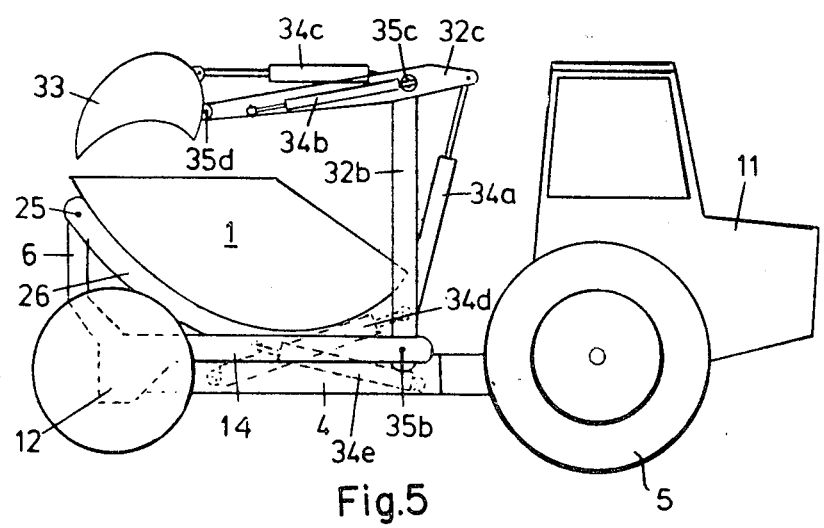
FIG. 5 shows in a schematic side view the structure of FIG. 4 in its load-transporting mode.
Figure 6:
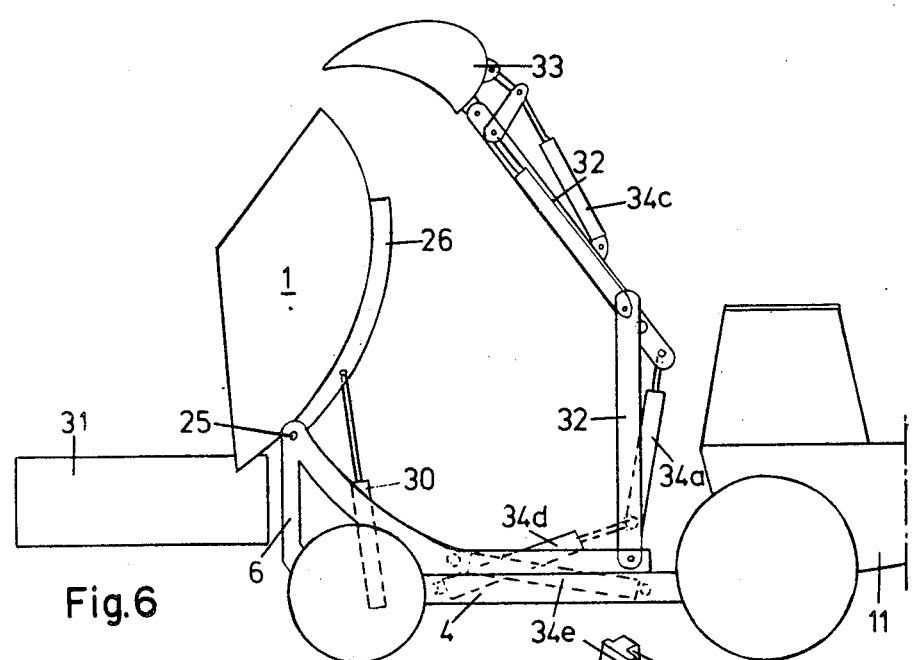
FIG. 6 is a schematic side elevation of the structure of FIGS. 4 and 5 in a load-discharging mode.

As has been indicated above, the load-carrier means of FIGS. 4–7 takes the form of a container 1 which has a curved wall 2. With this construction the arms 6 and 14 of the lever means can be interconnected by a curved reinforcing strut as is apparent from FIG. 7. This embodiment of the invention has a load-moving means 33 in the form of a scoop which of course may also be used with the embodiment of FIGS. 1–3 if desired. This scoop 33 is interconnected with the lever means by way of a linkage composed of a pair of link arms 32b pivotally connected by way of pivots 35b with the ends of the arms 14 distant from the lever axis 12. These linkage arms 32b are connected in common to a bracket which extends from a link arm 32c, a pivotal connection of the arms 32b with the arm 32c being provided by way of a pivot 35c. The arm 32c is pivotally connected directly with the scoop 33 by way of a pivot 35d. When the vehicle is in the mode for receiving a load as shown in FIG. 4, the lever arms 14 of course extend upwardly and the link arms 32b will now extend from the pivots 35b substantially horizontally and rearwardly, so that the linkage which carries the scoop 33 turns together with the lever means as is apparent from a comparison of FIGS. 4 and 5. Thus in the position of the parts shown in FIG. 4 it is possible to operate the scoop 33 in a manner described in greater detail below so as to be capable of moving material into the container 1. A hydraulic unit 34d is provided for turning the arms 32b about the pivots 35b with respect to the arms 14, in the manner which is clearly apparent from FIGS. 4–6. In addition, the arm 32c is capable of being turned about the pivot 35c with respect to the arms 32b by way of the hydraulic unit 34a in a manner apparent from the drawings. In addition, the scoop itself is capable of being turned with respect to the pivot 35d at the end of the arm 32c by way of a further hydraulic unit 34c. By way of a hydraulic unit 34b it is possible to achieve a certain amount of lateral adjustment of the scoop. In FIG. 6 the hydraulic unit 34c is shown as being interconnected with the scoop by way of an additional pivotal link as is apparent from the upper portion of FIG. 6.

Thus, by way of the above structure it is possible to achieve an extremely flexible operation of the load-moving means 33 for the purpose of displacing a load into the container 1.

Figure 7:
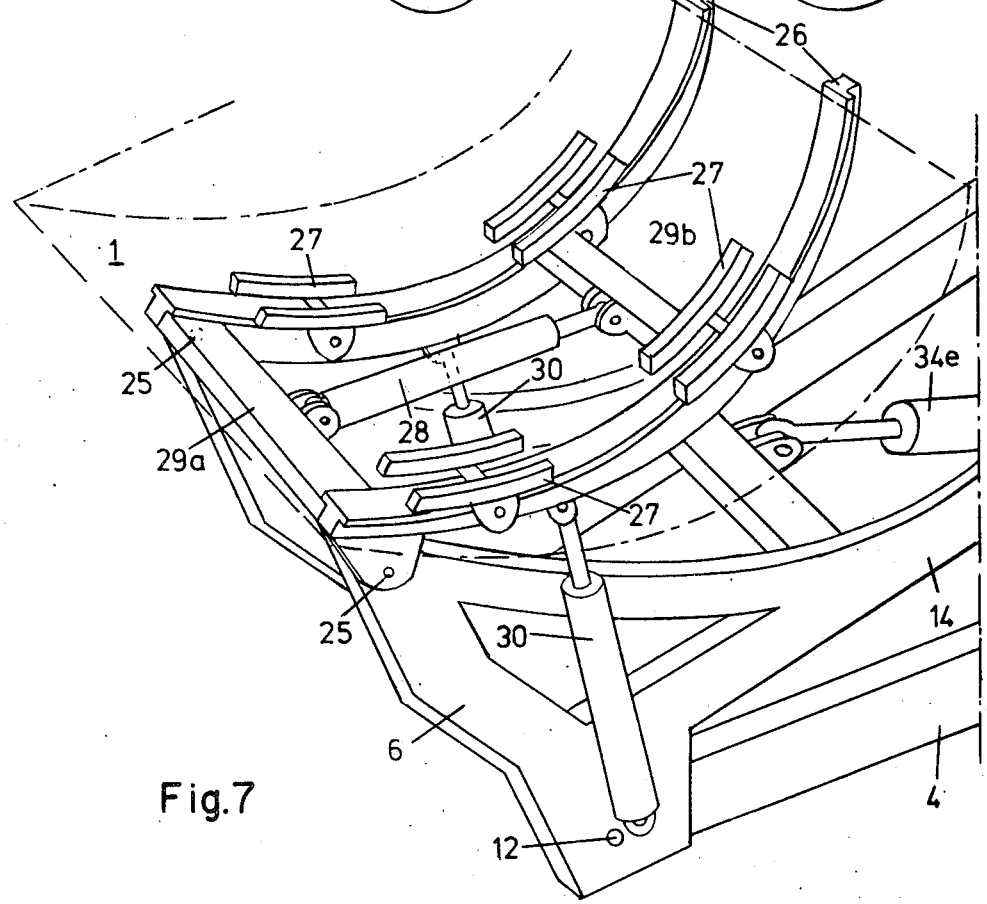
FIG. 7 is a fragmentary perspective illustration of details of the embodiment of FIGS. 4–6.

In the embodiment of FIGS. 4–7, the lever displacing means takes the form of the hydraulic unit 34e which is pivotally connected at one end to the frame and at its opposite end to a bar extending the levers, as shown most clearly in FIG. 7.

However, with this embodiment the container of load-carrier means 1 is not connected directly with the ends of the arms 6 distant from the lever axis determined by the pivots 12. Instead the container is carried by a pair of curved guiding tracks 26 which are part of the load-carrier means and form a guide means to permit the container to be further moved to an extended position as described below. As may be seen from FIG. 7, the outer convex surface of the curved wall 2 of the container is fixed with slidable and rolling guides 27 which are capable of sliding and rolling along the curved guides 26 which are fixed to each other by a transverse bar 29a and which are pivotally connected by way of pivots 25 to the arms 6, so that in this embodiment it is the pivots 25 which determine the carrier axis. A pair of hydraulic units 30 are interconnected between the bell crank and the curved guides 26 so as to swing the latter in unison about the common carrier axis formed by the pivots 25, in the manner which is most clearly apparent from FIGS. 6 and 7. Thus, the units 30 form the means for turning the load-carrier means 1 about the carrier axis so as to achieve the discharge mode shown in FIG. 6 where a load is shown being discharged into a load-receiving unit 31, which may form part of another vehicle.

In the embodiment of FIGS. 4–7, the pair of front movable guide members 27 are interconnected by a bar 29b, and a hydraulic unit 28 extends between the transverse bars 29a and 29b so that through the unit 28 it is possible to move the container of load-carrier means 1 along the guide rails 26 thereof. In this way when the structure is in the mode of FIG. 4 for taking on a load, it is possible to contact the hydraulic unit 28 so as to shift the container downwardly along the guides 26, shown projecting above the container 1 in FIG. 4, thus enabling the lower edge of the container to have an extremely favorable position with respect to a load. Once the load is received in the container, the unit 28 can be expanded so as to retract the container back to its initial position with respect to the curved guides 26, and then the structure can be returned to the load-transporting position of FIG. 5.

It is apparent, therefore, that with the embodiment of FIGS. 4–7 the same advantages are achieved as with the embodiment of FIGS. 1–3. Thus it will be seen that the load-carrier means of FIGS. 4–7 also situates the center of gravity of the load, in the load-transporting position of the load-carrier means, over the wheelbase. It is to be noted from FIG. 5 as well as FIG. 2, that when the load-carrier means of the above-described embodiments is in its load-transporting position, the load-carrier means has a lower portion situated directly over the frame means 4 while being closely adjacent thereto, so that in this way the center of gravity of the load has a relatively low elevation. Thus in this way also the stability of the vehicle during travel thereof with a load is enhanced.

Figure 8:
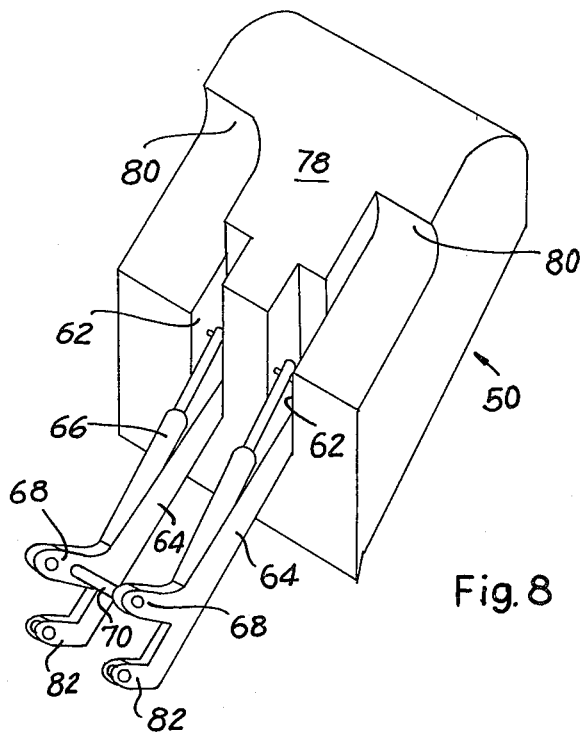
FIG. 8 is a perspective illustration of a further embodiment of a load-carrier shown in FIG. 8 in an inverted condition to illustrate more clearly how a lever means and displacing means are connected to the load-carrier.
Figure 9:
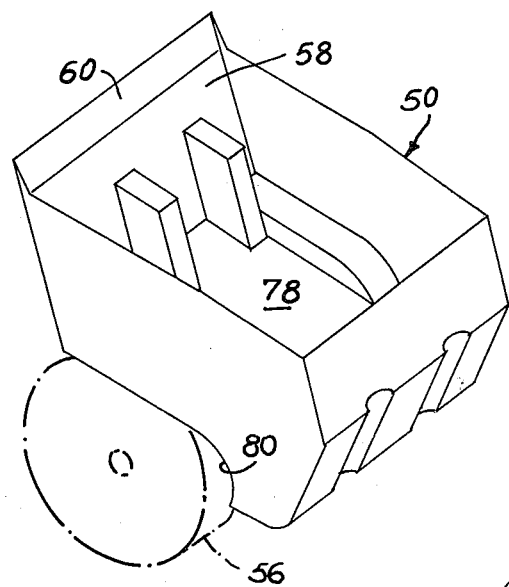
FIG. 9 is a perspective illustration of the load-carrier of FIG. 8 shown in its load-transporting mode and illustrating the hollow interior of the load-carrier.
Figure 10:
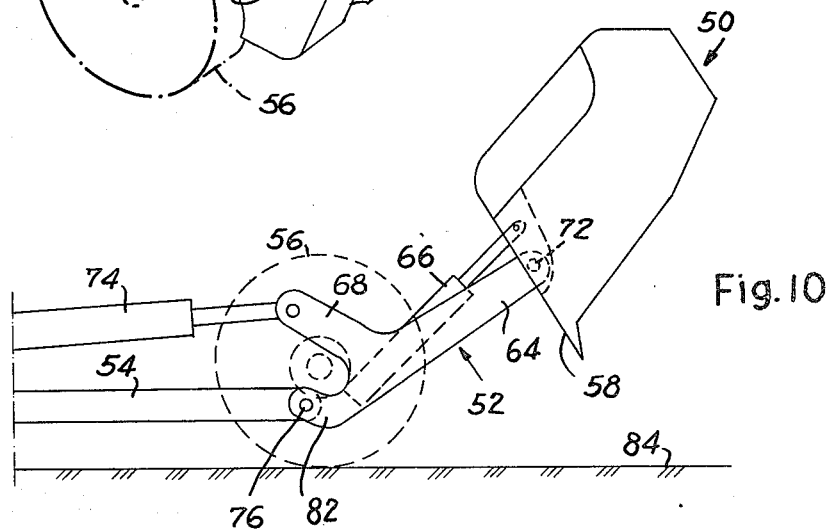
FIG. 10 is a schematic illustration of how the structure of FIGS. 8 and 9 is operated in order to discharge a load.

Referring now to FIGS. 8–10, there is shown therein a load-carrier means 50 connected by way of a lever means 52 to the frame means 54 which is schematically illustrated in FIG. 10. The frame means 54 of the vehicle fragmentarily shown in FIG. 10 is connected in any suitable way with the axles which support the wheels 56 which form the ground-engaging means of this embodiment. The load-carrier means 50 has a wall 58 which terminates in a relatively sharp free edge 60 enabling the structure when in its load-receiving position not only to take up a load but also to dig into a load for excavating purposes. It is this wall 58 which becomes situated at the lowest part of the carrier means next to the ground, if desired, when the carrier means is in its load-receiving position.

In accordance with a particular feature of the invention, the wall 58 is formed with at least one recess 62, although a pair of such recesses are shown in the illustrated embodiment. The lever means 64 extends into the recess or recesses 62, and the same is true of the carrier-displacing means 66.

Thus, it will be seen that in the illustrated example the lever means 52 includes a pair of elongated levers 64 having arms 68 fixed to each other by a bar 70. These arms 64 are pivotally connected with the carrier means 50 in the recesses 62 thereof to form the carrier axis 72 which, it will be noted from FIG. 10, is situated at a position extending across the recesses 62. It will be noted also that the connection of the pair of units 66 which form the carrier-displacing means to the carrier means 50 is within the recesses 62.

Moreover, as is apparent from FIG. 8 in particular, the levers 64 are hollow, and the carrier-displacing means 66 respectively extending into the hollow interiors of the levers 64. The ends of the units 66 distant from the carrier means 50 are pivotally connected with the arms 64 in the hollow interiors thereof.

The lever means 52 includes elongated arms 68 fixed to and extending angularly from each of the arms 64 and pivotally connected to the lever displacing means 74 which is of course connected distant from the lever means to the frame 54 in any suitable way. The hydraulic unit 74 is connected to the bar 70 so as to be able to turn the lever means 52 about the lever axis 76 in the manner most clearly apparent from FIG. 10.

The angularly extending arms 64 and 68 define between themselves an angle which may range from 80° to 160°, this angle preferably being approximately 110°.

It will be seen from FIGS. 8–10 that when the container 50 which forms the load-carrier means of this embodiment is in its load-transporting position shown in FIG. 9, the lower wall 78 of the container is situated at a low elevation enabling the center of gravity of the load to be maintained at an extremely low elevation, thus contributing to the stability. In order to enhance this feature, the wall 78 is formed with a pair of opposed side recesses 80 into which the ground-engaging means 56 extends. Thus in the illustrated example where the ground-engaging means 56 takes the form of wheels, these wheels extend into the recesses 80 so that the central portion of the wall 78 can be situated between the wheels in the load-transporting position of the carrier means 50 shown in FIG. 9. Thus as a result of this feature a high degree of stability is assured for the vehicle of the invention.

A further feature of the invention resides in the fact that the arm 64 of each lever of the lever means 52 has an elongated substantially straight configuration while being connected adjacent to the lever axis 76 to a cranked portion 82. When the carrier means 50 is in its load-receiving position the wall 58 can be situated in the same plane as the ground surface 84, this being the plane occupied by the ground-engaging means 56. Moreover, the straight portions 64 of the lever means 52 will at this time form an extension of the wall 58 extending also along the ground 84. This attitude of the carrier means 50 and lever means 52 when the carrier means is in its load-receiving position is highly advantageous particularly for excavation purposes. It is possible to achieve this result by providing the cranked portion 82 which is long enough to enable the substantially straight portion 64 to be situated so as to form an extension of the wall 58 when the latter is situated next to and extends along the ground 84.

It is thus apparent that the embodiment of FIGS. 8–10 also provides the advantages set forth above in connection with the other embodiments. Thus, the load-carrier means 50 when in its load-transporting position shown in FIG. 9 provides for the load a center of gravity which is situated in the region of the wheelbase of the vehicle, and in fact directly over the wheelbase. Of course in this embodiment also the load-carrier means 50 has, when in its load-transporting position, a lower portion situated directly over and adjacent to the frame means, as set forth above. Also, this embodiment provides for the load-carrier means a capacity according to which it is possible to carry a load the weight of which may be on the order of 150% of the weight of the entire unloaded vehicle.

It is furthermore to be noted that while in all of the embodiments described above, the vehicle has its own propelling means, it is equally possible to provide the structure of the invention in a trailer-type of vehicle which is moved by another vehicle such as a suitable tractor, truck, or the like. Moreover, while the ground-engaging means is shown in all of the embodiments as taking the form of pairs of wheels, other types of ground-engaging means may be utilized in the vehicle of the invention such as endless tracks.

A further advantageous feature of the invention, present in all of the embodiments described above and shown in the drawings, resides in the fact that while the load-carrier means of all embodiments when in its load-transporting position situates the center of gravity of the load over the wheelbase, nevertheless this center of gravity is closer to one of the axles than the other. Thus, it will be seen that in all of the embodiments of the invention the center of gravity of the load is situated by the load-carrier means when it is in its load-transporting position, closer to the rear axle than the front axle, while at the same time being situated over the wheelbase between these axles. With the particular type of vehicle shown in the drawings and described above, this feature is of considerable advantage inasmuch as a considerable weight will in any event be situated at the region of the front axle because the engine of the propelling means as well as the cab which carries the operator are situated at the region of the front axle. Thus, by way situating the center of gravity of the load over the wheelbase but closer to the rear axle, or in any event closer to the axle which is distant from the propelling means, a superior load-distribution is achieved for the entire vehicle inasmuch as the load carried by the load-carrier means, in the load-transporting position thereof, will compensate for and balance to a great extent the load formed by the engine, the cab, and the operator. Thus, while when the vehicle is unloaded or carries only a relatively light load, the greater concentration of weight at the axle where the engine is located will not undesirably interfere with the effective travel of the vehicle. However, as the load is increased the location of the center of gravity thereof by way of the load-carrier means when in its load-transporting position will result in an increase in the uniformity of the distribution of the load over all of the wheels, so that the stability of the vehicle during travel thereof with a substantial load is also enhanced by reason of this feature of the invention. Thus, where the vehicle has a propelling means adjacent one axle of the ground-engaging means, the situation of the center of gravity of the load, by the load-carrier means when in its load-transporting position, between the axles but closer to the other of the axles of the ground-engaging means serves to provide a substantially uniform distribution of the load over the entire ground-engaging means.

What is claimed is:

1. In a self-loading vehicle which is capable of digging into and/or taking on a load, transporting the load, and then discharging the load, frame means, ground-engaging means supporting said frame means for travelling movement, said ground-engaging means and frame means cooperating with each other for providing the vehicle with a wheelbase of predetermined length, lever means pivotally connected with said frame means for turning movement with respect thereto about a lever axis, load-carrier means pivotally connected to said lever means for turning movement with respect thereto about a carrier axis, lever-displacing means operatively connected between said frame means and said lever means for turning said lever means with respect to said frame means about said lever axis, and carrier-displacing means operatively connected between said lever means and said load-carrier means for turning the latter with respect to said lever means about said carrier axis, both of said displacing means, said lever means, and said load-carrier means cooperating with each other for situating said load-carrier means in a load-receiving position where said load-carrier means is relatively close to the ground and situated beyond said wheelbase, as well as for placing said load-carrier means in a load-transporting position where said load-carrier means is closer to said wheelbase than when said load-carrier means is in said load-receiving position thereof with said load-carrier means when in said load-transporting position thereof being situated sufficiently close to said wheelbase to provide for stable travel of the vehicle with a load carried by said load-carrier means, and for placing said load-carrier means in a load-discharging position where said load-carrier means has been turned about said carrier axis with respect to said lever means while said load-carrier means is situated at an elevation higher then when said load-carrier means is in said load-receiving position thereof, said load-carrier means when in its load-transporting position providing for the load a a center of gravity situated over the wheelbase of the vehicle, and said load-carrier means having a load-carrying capacity on the order of at least 75% of the weight of the vehicle itself, said load-carrier means when in its load-transporting position having a lower wall portion situated directly over said frame means while being adjacent thereto.

2. The combination of claim 1 and wherein said load-carrier means has a load-carrying capacity on the order of approximately 150% of the weight of the unloaded vehicle itself.

3. The combination of claim 1 and wherein said load-carrier means has a load-carrying capacity greater than the weight of the vehicle itself.

4. The combination of claim 1 and wherein said lower wall portion is situated in the region of said wheelbase.

5. The combination of claim 1 and wherein said lower wall portion is situated over said wheelbase.

6. The combination of claim 1 and wherein said ground-engaging means includes front and rear axles between which the wheelbase extends, propelling means carried by said frame means at the region of one of said axles for propelling the vehicle, said load-carrier means, when in its load-transporting position, providing for the load a center of gravity situated adjacent the other of said axles.

7. The combination of claim 6 and wherein said load-carrier means when in said load-transporting position thereof is situated over but adjacent the frame means to provide for the load a relatively low center of gravity.

8. The combination of claim 1 and wherein said load-carrier means includes a container having a wall situated at the lowest part of said container beyond said wheel base when said load-carrier means is in said load-receiving position thereof, and the latter wall of said container being formed with at least one recess into which said lever means and said carrier-displacing means extend.

9. The combination of claim 8 and wherein said carrier axis extends across said recess.

10. The combination of claim 8 and wherein said lever means has an elongated substantially straight portion which forms an extension of said wall of said container when the latter is in said load-receiving position, and said lever means having distant from said carrier axis a cranked portion extending angularly from said substantially straight portion thereof and terminating at the region of said lever axis.

11. The combination of claim 1 and wherein said ground-engaging means has a pair of axles between which said wheel base extends, and said lever axis being situated closely adjacent to one of said axles.

12. The combination of claim 10 and wherein said cranked portion of said lever means is sufficiently long to enable said elongated straight portion thereof and said wall of said container to be situated in the same plane as that of the ground engaged by the ground-engaging means.

13. In a self-loading vehicle which is capable of digging into and/or taking on a load, transporting the load, and then discharging the load, frame means, ground-engaging means supporting said frame means for travelling movement, said ground-engaging means and frame means cooperating with each other for providing the vehicle with a wheelbase of predetermined length, lever means pivotally connected with said frame means for turning movement with respect thereto about a lever axis, load-carrier means pivotally connected to said lever means for turning movement with respect thereto about a carrier axis, lever-displacing means operatively connected between said frame means and said lever means for turning said lever means with respect to said frame means about said lever axis, and carrier-displacing means operatively connected between said lever means and said load-carrier means for turning the latter with respect to said lever means about said carrier axis, both of said displacing means, said lever means, and said load-carrier means cooperating with each other for situating said load-carrier means in a load-receiving position where said load-carrier means is relatively close to the ground and situated beyond said wheelbase, as well as for placing said load-carrier means in a load-transporting position where said load-carrier means is closer to said wheelbase than when said load-carrier means is in said load-receiving position thereof with said load-carrier means when in said load-transporting position thereof being situated sufficiently close to said wheelbase to provide for stable travel of the vehicle with a load carried by said load-carrier means, and for placing said load-carrier means in a load-discharging position where said load-carrier means has been turned about said carrier axis with respect to said lever means while said load-carrier means is situated at an elevation higher than when said load-carrier means is in said load-receiving position thereof, said load-carrier means having in its load-transporting position a lower wall situated adjacent said frame means, and said lower wall being formed with a pair of opposed side recesses into which said ground-engaging means extends when said load-carrier means is in said load-transporting position thereof, so as to enable the center of gravity of the load to be situated at a relatively low elevation.

14. In a self-loading vehicle which is capable of digging into and/or taking on a load, transporting the load, and then discharging the load, frame means, ground-engaging means supporting said frame means for travelling movement, said ground-engaging means and frame means cooperating with each other for providing the vehicle with a wheelbase of predetermined length, lever means pivotally connected with said frame means for turning movement with respect thereto about a lever axis, load-carrier means pivotally connected to said lever means for turning movement with respect thereto about a carrier axis, lever-displacing means operatively connected between said frame means and said lever means for turning said lever means with respect to said frame means about said lever axis, and carrier-displacing means operatively connected between said lever means and said load-carrier means for turning the latter with respect to said lever means about said carrier axis, both of said displacing means, said lever means, and said load-carrier means cooperating with each other for situating said load-carrier means in a load-receiving position where said load-carrier means is relatively close to the ground and situated beyond said wheelbase, as well as for placing said load-carrier means in a load-transporting position where said load-carrier means is closer to said wheelbase than when said load-carrier means is in said load-receiving position thereof with said load-carrier means when in said load-transporting position thereof being situated sufficiently close to said wheelbase to provide for stable travel of the vehicle with a load carried by said load-carried means, and for placing said load-carrier means in a load-discharging position where said load-carrier means has been turned about said carrier axis with respect to said lever means while said load-carrier means is situated at an elevation higher than when said load-carrier means is in said load-receiving position thereof, said lever means having a hollow interior and said carrier-displacing means being situated at least in part in the hollow interior of said lever means.

15. The combination of claim 1 and wherein said lever means has a pair of elongated arms one of which is pivotally connected to said load-carrier means and the other of which is connected with said lever-displacing means, said arms extending angularly with respect to each other and including between themselves an angle in a range of from 80° to 160°.

16. The combination of claim 15 and wherein said angle is preferebly approximately 110°.

* * * * *